United States Patent [19]
Shibuya et al.

[11] Patent Number: 5,590,099
[45] Date of Patent: Dec. 31, 1996

[54] MAGNETO-OPTICAL RECORDING METHOD AND METHOD FOR MAKING INFORMATION-CARRYING MAGNETO-OPTICAL RECORDING MEDIUM

[75] Inventors: Giichi Shibuya, Chiba; Masanori Shibahara, Nagano; Suguru Takayama, Chiba; Hajime Utsunomiya, Nagano, all of Japan

[73] Assignee: TDK Corporation, Tokyo, Japan

[21] Appl. No.: 570,471

[22] Filed: Dec. 11, 1995

[30] Foreign Application Priority Data

Dec. 19, 1994 [JP] Japan .................................. 6-334523

[51] Int. Cl.⁶ ........................... G11B 11/00; G11B 13/00
[52] U.S. Cl. ............................................. 369/13; 369/14
[58] Field of Search ........................ 369/13, 14, 32, 369/47, 48, 54, 58, 110, 50, 275.2; 360/59, 114; 365/122

[56] References Cited

U.S. PATENT DOCUMENTS

| | | | |
|---|---|---|---|
| 5,182,741 | 1/1993 | Maeda et al. | 369/50 |
| 5,247,495 | 9/1993 | Birukawa et al. | 369/13 |

FOREIGN PATENT DOCUMENTS

| | | |
|---|---|---|
| 4-177644A | 6/1992 | Japan . |
| 4-353628A | 8/1992 | Japan . |
| 5-114138A | 7/1993 | Japan . |
| 5-89464A | 9/1993 | Japan . |
| 5-325295A | 10/1993 | Japan . |

*Primary Examiner*—Tan Dinh
*Attorney, Agent, or Firm*—Watson Cole Stevens Davis, PLLC

[57] ABSTRACT

In a magneto-optical recording disc of the magnetic field modulation recording mode, recording of information for the first time is carried out in an optical modulation mode at a linear velocity which is higher than a reading linear velocity. The time required for recording is reduced while the recorded disc produces satisfactory outputs on playback.

6 Claims, 2 Drawing Sheets

MAGNETO-OPTICAL RECORDING METHOD AND METHOD FOR MAKING INFORMATION-CARRYING MAGNETO-OPTICAL RECORDING MEDIUM

BACKGROUND OF THE INVENTION

1. Field of the Invention

This invention relates to a magneto-optical recording method suitable for high-speed recording of magneto-optical recording media of the magnetic field modulation mode, typical mini-discs (often abbreviated as MID) and a method for making an information-carrying magneto-optical recording medium.

2. Prior Art

Systems for converting audio and video information into digital signals and recording them in rewritable media as typified by magneto-optical discs are utilized in audio and video applications mainly for consumer use. There is also a tendency that computer software contains an increasing amount of information and it is considered to utilize high capacity media as means for storing and transferring such a vast amount of information. Information must be recorded in an unrecorded media at a high speed before such attempts can be successful in practice. However, many disc media have recording tracks previously inscribed at the shipment from the factory and must obey various restrictions associated with the principle of recording and reading operation. They cannot be recorded by a simple process like magnetic transfer as in the case of magnetic tape and optical transfer. There is no other way than copying information in such a disc on a real time basis, undesirably taking a long time.

Especially for recording in the magnetic field modulation mode, no substantial saving of recording time is expectable since the electronic circuit imposes some restrictions on the recording linear velocity.

Mini-discs (MD) are one class of magnetic field modulation mode recording media. With respect to audio mini-discs, for example, consumers have a demand that in a rental shop or some place where a number of musical tunes are available from gramophonic records, compact discs, and other sources, the consumer carries his or her own mini-disc with, pays a fee to the shop, chooses favorite tunes, and dubs them in the mini-disc to make a private special disc. In such a situation, it is desirable to complete recording within a short time. The recording in the magnetic field modulation mode, however, has system restrictions as mentioned above and does not permit high speed recording above a certain linear velocity because increasing the recording linear velocity above the limit results in outputs with low C/N.

There is a desire to have a method capable of high speed recording without raising such problems.

SUMMARY OF THE INVENTION

An object of the present invention is to provide a magneto-optical recording method capable of recording information in a magneto-optical recording medium of the magnetic field modulation mode, typical a mini-disc such that the time required for recording information can be reduced while the medium after information is recorded is maintained in good conditions in that the medium is read with satisfactory C/N and the medium can be further recorded in the magnetic field modulation mode.

Another object of the present invention is to provide a method for making an information-carrying magneto-optical recording medium.

In the present invention, a magneto-optical recording medium including a groove having a wobble is operated in a recording/reading apparatus adapted to carry out recording and reading operation in a magnetic field modulation mode.

According to a first aspect of the invention, there is provided a method for recording information in the magneto-optical recording medium while controlling a recording linear velocity in accordance with the wobble, and recording address-related information at the end of recording. The recording of information for the first time is carried out in an optical modulation mode at a linear velocity which is higher than a reading linear velocity. The recording linear velocity is preferably 1.1 to 20 times the reading linear velocity which is typically 1.2 to 1.4 m/s. Preferably, a strong magnetic field is applied to the recording medium for erasing any information therein prior to the recording of information for the first time.

According to a second aspect of the invention, there is provided a method for making an information-carrying magneto-optical recording medium by applying a sufficient magnetic field to the recording medium to erase any information therein for initialization, selecting record information preferably consisting of digital signals, and recording the selected record information in the initialized recording medium in an optical modulation mode at a linear velocity which is higher than a reading linear velocity. The recording linear velocity is preferably 1.1 to 20 times the reading linear velocity. The information-carrying magneto-optical recording medium thus made can be operated in a recording/reading apparatus adapted to carry out recording and reading operation in a magnetic field modulation mode.

ADVANTAGES

According to the invention, the first recording of a magneto-optical recording medium of the magnetic field modulation mode is carried out in an optical modulation mode. Recording in the optical modulation mode allows the recording linear velocity to be increased beyond the reading linear velocity without being accompanied by a loss of C/N during reading at the (lower) linear velocity. High speed recording is possible.

In the magnetic field modulation mode, the time required to switch the magnetic field is governed by the performance of a system including a magnetic head. Then the influence of a switching magnetic field on record marks increases as the record frequency increases. As a result, C/N lowers as the recording linear velocity increases. Accordingly, high speed recording above a certain recording linear velocity was regarded impossible. The present invention solves this problem.

In prior art optical discs, high speed recording is carried out for various purposes. For example, Japanese Patent Application Kokai (JP-A) No. 177644/1992 discloses a magneto-optical compact disc operating apparatus which rewrites data in the magneto-optical compact disc by rotating the disc at a linear velocity which is two or three folds of the reading linear velocity, dividing the record data per track on the disc, high speed reading the divided record data within a time of ½ or ⅓, and carrying out erasing of previous data, recording of new data and verification of newly recorded data while the disc rotates two or three revolutions. It is alleged that pseudo-real-time rewriting can be accomplished. This apparatus, however, is designed for the purpose of reducing the time of overwriting in an optical modulation mode. This patent reference contains no teaching about the present invention that the first recording of a magneto-optical recording medium of the magnetic field modulation mode is carried out in an optical modulation mode.

JP-A 353628/1992 discloses a method for recording signals in a write-once optical disc of the compact disc standard, comprising the step of high-speed recording while rotating the disc at a constant linear velocity of at least 2.4 m/s. There is obtained a tracking servo gain necessary to read at the standard velocity in a compact disc reading apparatus of the three beam system. The optical disc used in this method, however, is of a pit formation type and different from magneto-optical recording media as used in the present invention.

JP-A 89464/1993 discloses a method for recording information in a recording medium having a dye recording layer and a reflecting layer on a pre-grooved disc-shaped substrate, the method comprising the step of recording while rotating the medium at a linear velocity higher than the linear velocity during reading. Then several tens of optical discs having a relatively small amount of the same information recorded therein (e.g., software-containing CDs) can be easily made. The optical disc used in this method has the dye recording layer rather than the magneto-optical recording layer as in the present invention.

JP-A 114138/1993 discloses a method for recording and reading an optical recording disc at a recording linear velocity and a reading linear velocity, respectively, the recording linear velocity being higher than the reading linear velocity. This method ensures reading with minimized errors using a conventional write/read apparatus producing a laser beam of a conventional diameter. The optical recording disc used in this method has a dye layer as the recording layer in contrast to the present invention. Although it is indicated that the method is applicable to magneto-optical discs, this patent reference contains no teaching about the present invention that the first recording of a medium of the magnetic field modulation mode is carried out in an optical modulation mode.

JP-A 325295/1993 discloses a method for recording information in a magneto-optical recording medium in a magnetic field modulation mode by setting the recording linear velocity to at least 1.5 m/s, compressing information signals to be recorded, and effecting intermittent recording whereby the information is recorded as continuous signals on the recording track. This overcomes the inconvenience that a low linear velocity during recording in the magnetic field modulation mode results in a very gentle temperature profile and hence, a low recording margin. A sufficient recording margin is available. This patent reference shows in Experiment 2 that recording is done at a linear velocity higher than the reading linear velocity, although it contains no teaching about the present invention that the first recording of a medium is carried out in an optical modulation mode.

BRIEF DESCRIPTION OF THE DRAWINGS

These and further features of the present invention will be apparent with reference to the following description and drawings, wherein.

DETAILED DESCRIPTION OF THE INVENTION

Figure 1:
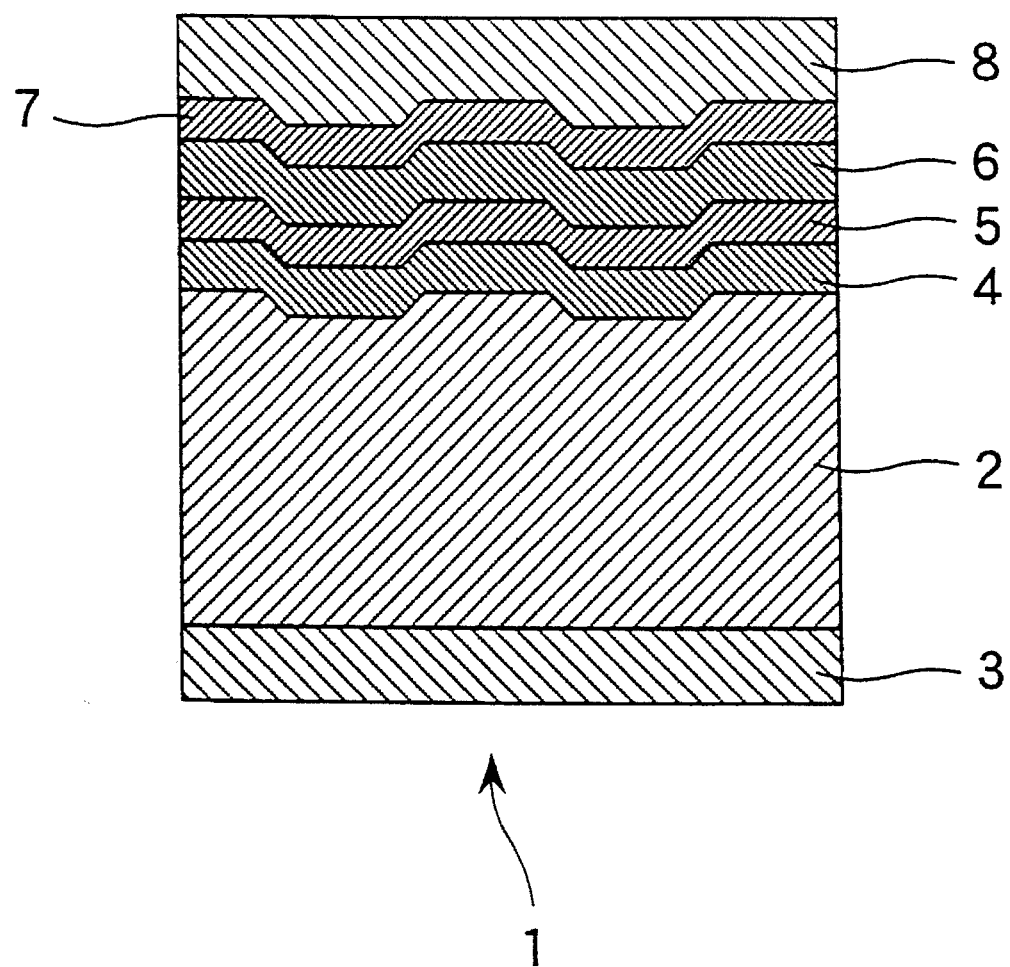
FIG. 1 is a schematic cross-sectional view showing one exemplary structure of a magneto-optical disc used in the method of the present invention.

The magneto-optical recording medium used in the present invention is of the magnetic field modulation mode and used in a recording/reading apparatus adapted to carry out recording and reading operation in the magnetic field modulation mode. The recording/reading apparatus may include a writing or recording unit and a reading or playback unit integrally or separately. Preferably the magneto-optical recording media are magneto-optical recording discs of the magnetic field modulation mode which can record audio information, video information or computer software information. Most preferred among such magneto-optical recording discs are mini-discs (MD) which are designed to record such record information while controlling the linear velocity in accordance with their wobble and record address-related information at the end of recording. The mini-discs may be for either audio or video recording, with a particular interest in audio mini-discs intended for recording musical tunes. The information signals to be recorded may be analog signals or digital signals, with the digital signals being preferred because of less chance of signal deterioration.

Although the magneto-optical recording medium is of the magnetic field modulation mode, the present invention carries out writing or recording of information for the first time in the medium in an optical modulation mode. The use of an optical modulation mode enables high speed recording without detracting from C/N and other reading characteristics. Attempts to increase the recording speed in the magnetic field modulation mode will result in losses of reading characteristics due to system restrictions.

The medium to be recorded in the optical modulation mode is a medium which contains no magneto-optically recorded information, for example, a medium which is unused and initialized. A used medium is acceptable if it is initialized by erasing the once recorded magneto-optical information. Initialization is preferably carried out by applying a strong magnetic field to the medium. The applied magnetic field preferably has a strength of 10 to 20 kOe, typically about 15 kOe. Usually initialization requires 2 or 3 seconds to 50 or 60 seconds per mini-disc.

During the recording of the medium for the first time in an optical modulation mode according to the invention, the recording linear velocity should be higher than the reading linear velocity. The optical modulation mode used herein prevents high speed recording from leading to losses of C/N and other reading characteristics. This is because unlike the magnetic field modulation mode, the optical modulation mode eliminates the influence of a switching magnetic field on record marks increasing with the record frequency.

Preferably the recording linear velocity is 1.1 to 20 times, more preferably 1.1 to 10 times, most preferably 2 to 6 times the reading linear velocity. With the ratio of recording linear velocity to reading linear velocity set within this range, high speed recording becomes possible while maintaining satisfactory C/N and other reading characteristics. A too low recording linear velocity would negate the advantage of high speed recording whereas a too high recording linear velocity would result in losses of C/N and the like.

The reading linear velocity is a normal linear velocity during playback which is generally in the range of 1.2 to 1.4 m/s. The present invention is characterized in that information is recorded at a higher velocity and read at a normal velocity. Therefore, the recording linear velocity is preferably 1.3 to 20 m/s, more preferably 1.3 to 10 m/s, most preferably 2 to 6 m/s.

It is noted that the linear velocity is the velocity at which a laser beam for recording or playback operation moves along a track upon tracking.

When the first time of recording is carried out in an optical modulation mode according to the invention, it is preferred to illuminate a laser beam having a pulse duration smaller than a recording pulse duration, that is, a low duty ratio and at an optimum power. This ensures optimum heat transfer through the medium upon illumination of the medium with laser beam pulses, effectively forming record marks.

The duty ratio is preferably up to 50%, more preferably about 20 to 40% and the optimum recording power is preferably about 4 to 15 mW although both vary depending on the recording linear velocity.

After record information has been recorded as mentioned above and predetermined address-related information has been recorded, the magneto-optical recording medium can be used similarly to conventional magneto-optical recording media of the magnetic field modulation mode. More particularly, the region where information has been recorded in the optical modulation mode may be subject to overwriting in the magnetic field modulation mode. If an unrecorded region is left in the medium after recording in the optical modulation mode, the unrecorded region may be recorded with additional information in the magnetic field modulation mode.

According to the present invention, an information-carrying magneto-optical recording medium can be made by utilizing the magneto-optical recording method defined above. This assumes a situation that in a shop furnished with dubbing equipment, the consumer chooses his or her favorite tune and records it in his or her own audio mini-disc, for example. In such a situation, it takes about 1 to 15 minutes to complete recording of a single audio mini-disc provided that the disc has been initialized. This recording time is about 75 to 98% shorter than the recording time required in the magnetic field modulation mode. The information-carrying magneto-optical recording medium thus made may then be operated and additionally recorded in an unrecorded region if any by the consumer's own recorder/player of the magnetic field modulation mode. If the recorded information becomes uninteresting, the medium can be overwritten. Another situation contemplated at present is to produce a number of discs by high speed recording for the purpose of mass-scale distribution. Depending on a particularly purpose and application, information-carrying magneto-optical recording media can be readily made by virtue of high speed recording.

Referring to FIG. 1, there is schematically illustrated one exemplary structure of the magneto-optical recording medium used herein. FIG. 1 shows one typical magneto-optical recording disc generally designated at 1. The magneto-optical disc 1 includes on a major surface of a transparent substrate or base 2, a first dielectric film 4, a recording film 5, a second dielectric film 6, a reflective film 7, and a protective coat 8 from bottom to top in the described order.

The substrate 2 is a generally annular transparent substrate. Information is recorded in and read out of the magneto-optical disc of the present invention by positioning an optical head on the rear side of the substrate 2 (the lower side as viewed in FIG. 1) so that laser light is directed to the recording film 5 through the substrate 2. The substrate is generally formed of resins such as polycarbonate resins, acrylic resins, amorphous polyolefin resins, and styrene resins as well as glass.

The surface of the substrate 2 includes a grooved region where adjacent grooves are separated by lands. The recording film 5 covers the grooved region. Each groove has a radial width of about 0.90 to 1.15 μm between lands and a depth of about 60 to 90 nm. The groove depth is the distance between the land surface and the groove bottom as measured in a direction perpendicular to the substrate major surface. If the land surface and the groove bottom are not flat, the groove depth is the perpendicular distance between the highest peak of the land surface and the lowest valley of the groove bottom. The groove is generally in spiral or concentric arrangement and provided for the purpose of tracking by a laser beam for recording and playback operation. The groove is wobbled for enabling control of a linear velocity. Usually in-groove recording is employed. The track pitch is about 1.2 to 1.6 μm The first and second dielectric films 4 and 6 are provided for improving C/N and preventing corrosion of the recording film. Although dielectric films are optional, it is desirable to provide at least one, especially both of the first and second dielectric films. Preferably the first dielectric film has a thickness of about 40 to 200 nm and the second dielectric film has a thickness of about 10 to 100 nm. The first dielectric film 4 is typically formed from a metal nitride, oxide, carbide or sulfide, preferably a mixture thereof. The second dielectric film 6 is typically formed of a metal nitride, preferably in admixture with a metal oxide, carbide or sulfide. The metal used herein is Si, Al or Zn or a mixture thereof with La, Ce, Nd or Y. Each dielectric film contains at least one metal element. The first and second dielectric films are not critical in their combination and need not contain the same elements. The dielectric films may be formed by sputtering.

The recording film 5 is one in which information can be magnetically recorded using a modulated thermal beam (laser beam) or modulated magnetic field and the recorded information be read through magneto-optical conversion. The recording film 5 may be formed of any desired material which is capable of both magnetic field modulation mode recording and optical modulation mode recording. Preferably, it is of an alloy containing a rare earth metal element and a transition metal element. The rare earth element is at least one element selected from the group consisting of Tb, Dy, Nd, Sm, Pr and Ce and the transition element is essentially Fe, preferably in admixture with Co. The contents of the respective elements in the alloy may be properly determined in accordance with a desired Curie temperature, coercivity, and reading characteristics. Provided that R stands for a rare earth element, the preferred recording film alloy has a composition $R_A Fe_B Co_C$ wherein A, B and C representing atomic ratios are in the range: $10 \leq A \leq 35$, $55 \leq B \leq 75$, $3 \leq C \leq 15$, and A+B+C=100. In addition to these elements, any additional element such as Cr and Ti may be contained in the recording film, preferably in an amount of up to 12 at %. Preferred additional elements are Cr and/or Ti in a total amount of 1 to 10 at %. Some preferred examples of the recording film composition are Tb—Fe—Co, Tb—Fe—Co—Cr, Tb—Fe—Co—Ti, Tb—Fe—Co—Cr—Ti, Dy—Tb—Fe—Co, and Nd—Dy—Fe—Co. The recording film is generally about 10 to 100 nm thick. The recording film is typically formed by sputtering.

The reflective film 7 is optionally disposed for the purpose of C/N improvements. It is formed of any of relatively high reflectivity metal materials which include Au, Ag, Pt, Al, Ti, Cr, Ni and Co and alloys or compounds thereof. The reflective film may be formed by sputtering to a thickness of about 30 to 200 nm.

The protective coat 8 is a resin film formed for protecting the underlying sputtered films. The resin of which the protective coat 8 is made is not critical although cured products of radiation-curable compounds are preferred. Preferred radiation-curable compounds are acryl group-containing ones. Preferably a coating of an acryl-containing compound and a photo-polymerization sensitizer or initiator is cured with ultraviolet radiation or electron ray to form a protective coat. The protective coat preferably has a thickness of about 1 to 30 μm, more preferably about 2 to 20 μm. With a thickness below this range, it would be difficult to form a film of uniform thickness, resulting in a loss of durability. A too thick film would crack due to shrinkage during curing so that the disc tends to warp.

On the rear surface of the substrate 2 is formed a transparent hard coating 3 as shown in FIG. 1, if desired. The composition and thickness of the hard coating may be the same as the protective coat 8. Preferably the hard coating 3 is rendered antistatic by adding a surfactant or the like. The hard coating may be disposed not only on the rear surface of the substrate, but also on the inner and outer peripheral edges of the disc.

In the structure shown in FIG. 1, an intermediate film may be disposed between the recording film 5 and the second dielectric film 6 for improving reliability and playback stability, if desired. It may be formed of Ti, Cr, Nb or the like for the reliability improvement and of Co, Ni or the like for the playback stability improvement. The intermediate film may be formed by sputtering, preferably to a thickness of 0.1 to 2.8 nm, especially 0.2 to 1.8 nm.

EXAMPLE

Examples of the present invention are given below by way of illustration and not byway of limitation.

Example 1

Magneto-optical disc samples were prepared by forming on a transparent substrate a first dielectric film, a recording film, a second dielectric film, a reflective film, and a protective coat in the described order under the conditions mentioned below.

Transparent substrate

The transparent substrate used was a polycarbonate resin disc having an outer diameter of 64 mm, an inner diameter of 11 mm and a thickness of 1.2 mm. The substrate was formed with a spiral groove having a wobble and a tracking pitch of 1.6 μm.

First dielectric film

After the vacuum chamber was evacuated to a vacuum of at least $5.0 \times 10^{-5}$ Pa, the first dielectric film was formed on the substrate by reactive magnetron sputtering of a silicon target while passing argon gas and nitrogen gas through the chamber. The sputtering conditions are given below.

input power: 1 kW sputtering gas pressure: 0.1 Pa

Ar gas flow rate: 31 SCCM

N$_2$ gas flow rate: 19 SCCM

The first dielectric film was 60 nm thick.

Recording film

After formation of the first dielectric film, the vacuum chamber was evacuated to a vacuum of at least $5.0 \times 10^{-5}$ Pa again. While passing argon gas through the chamber, magnetron sputtering of a Tb—Fe—Co alloy target was carried out to form a recording film consisting essentially of Tb—Fe—Co. The sputtering conditions are given below.

input power: 1 kW sputtering gas pressure: 0.2 Pa

Ar gas flow rate: 98 SCCM

The recording film was 20 nm thick and its composition was $Tb_{20.0}Fe_{70.0}Co_{7.0}Cr_{3.0}$ in atomic ratio.

Second dielectric film

After formation of the recording film, the vacuum chamber was evacuated to a vacuum of at least $5.0 \times 10^{-5}$ Pa again. The second dielectric film was formed on the recording film by reactive magnetron sputtering of a silicon target while passing argon gas and nitrogen gas through the chamber. The sputtering conditions are given below.

input power: 1 kW sputtering gas pressure: 0.1 Pa

Ar gas flow rate: 31 SCCM

N$_2$ gas flow rate: 19 SCCM

The second dielectric film was 20 nm thick.

Reflective film

After formation of the second dielectric film, the vacuum chamber was evacuated to a vacuum of at least $5.0 \times 10^{-5}$ Pa again. The reflective film was formed by magnetron sputtering of an aluminum alloy target while passing argon gas through the chamber. The sputtering conditions are given below.

input power: 750 W sputtering gas pressure: 0.15 Pa

Ar gas flow rate: 10 SCCM

The reflective film was 60 nm thick.

Note that the thickness of each sputtered film was calculated from the sputtering rate and sputtering time. The sputtering rate was previously calculated by continuing sputtering under the same conditions as the actual film formation step for a longer time to form a thick film, measuring the thickness of the thick film, and dividing the thickness by the sputtering time.

Protective coat

The protective coat was formed by spin coating a polymerizable composition comprising 50 parts by weight of an oligo-ester acrylate having a molecular weight of 5,000, 50 parts by weight of trimethylolpropane triacrylate, and 3 parts by weight of an acetophenone photo-polymerization initiator. The coating was exposed to UV for curing. The coat as cured had an average thickness of about 5 μm.

The thus obtained magneto-optical recording disc samples were initialized by applying a magnetic field of 15 kOe thereto. In the disc samples as initialized, a 3T signal of EFM was recorded in a magnetic field modulation mode or an optical modulation mode at a linear velocity as shown in Table 1. Using a MD rating system MJ-6100 manufactured by Sony Techtronics K. K., the recorded disc samples were measured for C/N. For recording at lower speeds of up to the quadruple or 4-fold speed, a recorder model DDU-1000 manufactured by Pulstec Industry K. K. was used for both the magnetic field modulation mode and optical modulation mode. For recording at higher speeds in excess of the quadruple speed, a recorder model VRF-2000 of the optical modulation mode manufactured by Nakamichi K. K. was used. The laser beam used on recording had a duty ratio and an optimum recording power as reported in Table 1. The external magnetic field applied had a strength of 200 Oe for recording in the magnetic field modulation mode and 200 Oe for recording in the optical modulation mode. The reading linear velocity for C/N measurement was 1.4 m/s.

Figure 2:
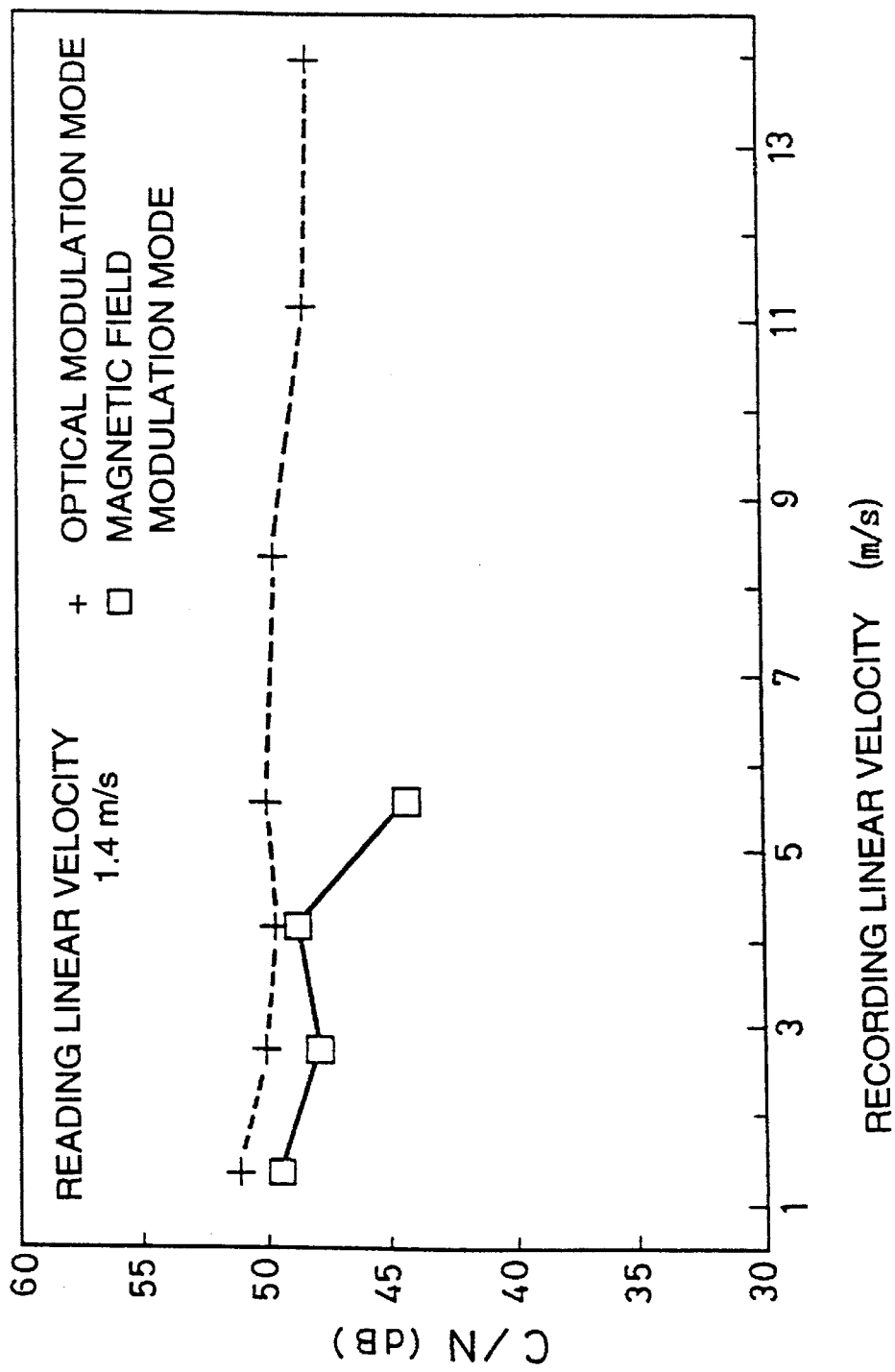
FIG. 2 is a diagram showing the C/N versus recording linear velocity of disc samples recorded in the magnetic field modulation mode and optical modulation mode.

The C/N measurements are shown in Table 1 and FIG. 2.

TABLE 1

| Recording linear velocity (m/s) | Magnetic field modulation mode | | | Optical modulation mode | | |
|---|---|---|---|---|---|---|
| | Optimum recording power (mW) | Duty ratio (%) | C/N (dB) | Optimum recording power (mW) | Duty ratio (%) | C/N (dB) |
| 1.4 (1 fold) | 4.0 | 33 | 49.4 | 4.5 | 33 | 51.0 |
| 2.8 (2 fold) | 5.0 | 33 | 47.7 | 5.0 | 33 | 49.9 |
| 4.2 (3 fold) | 6.0 | 33 | 48.5 | 6.0 | 33 | 49.5 |
| 5.6 (4 fold) | 6.5 | 25 | 44.2 | 6.5 | 25 | 49.8 |
| 8.4 (6 fold) | — | — | — | 8.5 | 25 | 49.5 |
| 11.2 (8 fold) | — | — | — | 9.5 | 25 | 48.2 |
| 14.0 (10 fold) | — | — | — | 12.0 | 25 | 48.0 |

As seen from Table 1 and the curves in FIG. 2, the recording in the optical modulation mode maintains higher C/N ratios than the magnetic field modulation mode. In the magnetic field modulation mode, a drop of C/N occurred at a velocity of about 5.6 m/s (4 fold) and further increasing the velocity was impossible for the system reason. In the optical modulation mode, recording at a high velocity of 14 m/s (10 fold) still led to playback with a high C/N.

An overwriting test was then carried out. Tested was the magneto-optical disc sample which was recorded at the quadruple speed in the optical modulation mode. Using the same recorder of the magnetic field modulation mode, signals were overwritten in the disc sample at a linear velocity of 1.4 m/s. Good overwriting properties were recognized. The overwrite properties were evaluated by measuring C/N and C1 error by means of a MD rating system MJ-6100 manufactured by Sony Techtronics K. K. The C/N ratio was judged satisfactory when it was 46 dB or more. The C1 error was judged satisfactory when it was 10 errors/second or less. This disc sample showed a C/N ratio of 49.5 dB and a C1 error of less than 10 errors/second, both satisfactory. Note that the disc sample showed a C1 error of less than 10 errors/second before the overwriting test.

Separately from the disc sample subject to the overwriting test, another magneto-optical disc sample which was recorded at the quadruple speed in the optical modulation mode was prepared. The same signal as above was recorded in an unrecorded region of this disc sample at a linear velocity of 1.4 m/s using the same recorder of the magnetic field modulation mode. The disc sample was played back to show a C/N ratio of 51.0 dB. Satisfactory recording was possible in the unrecorded region.

It is evident that the magneto-optical disc once recorded at a high linear velocity in the optical modulation mode is ready for normal operation, that is, recording and overwriting in the magnetic field modulation mode.

Example 2

A commercially available audio mini-disc (trade name MD-XG60 manufactured by TDK Corporation) was initialized by applying a magnetic field of 15 kOe thereto by means of TYPE CMD-2520 manufactured by Nihon Magnes K. K. In the mini-disc as initialized, a 3T signal of EFM was recorded in the optical modulation mode at a linear velocity of 5.6 m/s (4 fold) using a recorder model DDU-1000 manufactured by Pulstec Industry K. K. Recording was done in a data zone of the recording region. The initialization step took 4 or 5 seconds and the recording step took about 4 minutes.

Using the recorder model DDU-1000 manufactured by Pulstec Industry K. K., the thus recorded mini-disc was played back at a linear velocity of 1.4 m/s (1 fold), with satisfactory results.

Now that the recorded data were unnecessary, musical tunes were overwritten in the mini-disc at a linear velocity of 1.4 m/s (1 fold) using a commercial recorder/player model MDS-102 of the magnetic field modulation mode manufactured by Sony K. K. The over-dubbed mini-disc was played back, finding satisfactory results.

There has been described a method for recording a magneto-optical recording medium wherein recording of information for the first time is carried out in an optical modulation mode, thereby making it possible to record at a high speed and hence, within a short time while ensuring satisfactory reading operation. The medium is thereafter operable equally to conventional media of the magnetic field modulation mode.

Japanese Patent Application No. 334523/1994 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A method for recording information in a magneto-optical recording medium including a groove having a wobble, which is operated in a recording/reading apparatus adapted to carry out recording and reading operation in a magnetic field modulation mode, comprising the steps of recording information while controlling a recording linear velocity in accordance with the wobble, and recording address-related information at the end of recording, wherein the recording of information for a first time being carried out in an optical modulation mode at a linear velocity which is higher than a reading linear velocity.

2. The magneto-optical recording method of claim 1 further comprising, prior to the recording of information for the first time, the step of applying a sufficient magnetic field to the recording medium to erase information therein.

3. The magneto-optical recording method of claim 1 wherein the recording linear velocity is 1.1 to 20 times the reading linear velocity.

4. A method for making an information-carrying magneto-optical recording medium which is operated in a recording/reading apparatus adapted to carry out recording and reading operation in a magnetic field modulation mode, comprising the steps of applying a sufficient magnetic field to the recording medium to erase information therein for initialization, selecting record information, and recording the selected record information in the initialized recording medium in an optical modulation mode at a linear velocity which is higher than a reading linear velocity.

5. The method of claim 4 wherein the record information comprises digital signals.

6. The method of claim 4 wherein the recording linear velocity is 1.1 to 20 times the reading linear velocity.

* * * * *